United States Patent [19]

Koblesky

[11] Patent Number: 4,790,693
[45] Date of Patent: Dec. 13, 1988

[54] INTERFITTING ON-EDGE INSERTS FOR MILLING CUTTERS

[75] Inventor: Robert T. Koblesky, Rockford, Ill.

[73] Assignee: Ingersoll Cutting Tool Company, Rockford, Ill.

[21] Appl. No.: 214,862

[22] Filed: Jul. 1, 1988

Related U.S. Application Data

[63] Continuation of Ser. No. 11,591, Feb. 6, 1987, abandoned.

[51] Int. Cl.⁴ ............... B23C 5/10; B23C 5/20
[52] U.S. Cl. ............................... 407/35; 407/42; 407/59; 407/113
[58] Field of Search ............ 407/34, 35, 42, 53, 407/54, 58, 59, 63, 113, 114

[56] References Cited

U.S. PATENT DOCUMENTS

| | | | |
|---|---|---|---|
| 4,539,875 | 9/1985 | Lee et al. | 407/113 |
| 4,573,831 | 3/1986 | Lacey | 407/58 |
| 4,648,755 | 3/1987 | Stashko | 407/36 |
| 4,648,760 | 3/1987 | Karlsson et al. | 407/113 |

FOREIGN PATENT DOCUMENTS

| | | | |
|---|---|---|---|
| 1517204 | 3/1968 | France | 407/114 |
| 2431897 | 3/1980 | France | 407/114 |
| 1024167 | 6/1983 | U.S.S.R. | 407/113 |

OTHER PUBLICATIONS

Brookes, Kenneth J. A., *World Directory and Handbook of Hardmetals*, Third Edition, 1982, title page and p. 89.

Primary Examiner—Frederick R. Schmidt
Assistant Examiner—William E. Terrell
Attorney, Agent, or Firm—Fitch, Even, Tabin & Flannery

[57] ABSTRACT

Shown and described is an on-edge cutting insert for milling cutters in the form of a flat six-sided block having two parallel major faces which are seating and clearance faces, and two opposed edge surfaces which are rake faces which intersect at least one major face of the flat block to form two parallel cutting edges therewith, and two other opposed edge surfaces which are recessed centrally of their major dimension to form sideward projections of the cutting edges at the corners of the major faces.

The recesses accommodate the sideward projections of the cutting edges of the adjacent inserts in an interfitting array of inserts along a single chip gullet in which the several inserts sweep contiguous concentric segments of a more extensive uninterrupted cutting path.

6 Claims, 3 Drawing Sheets

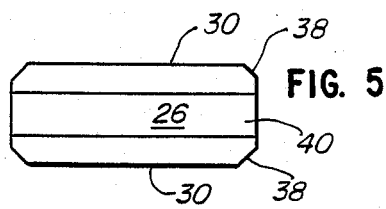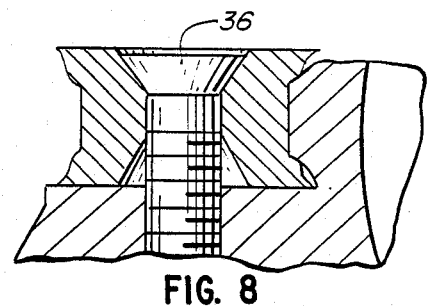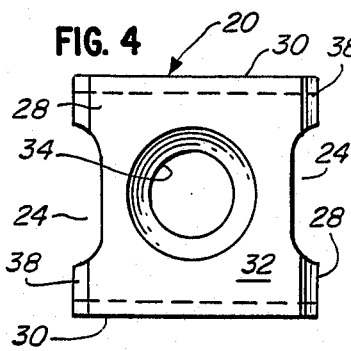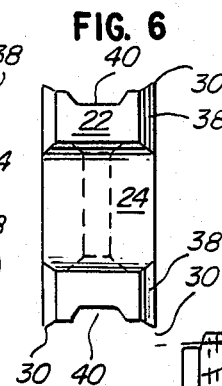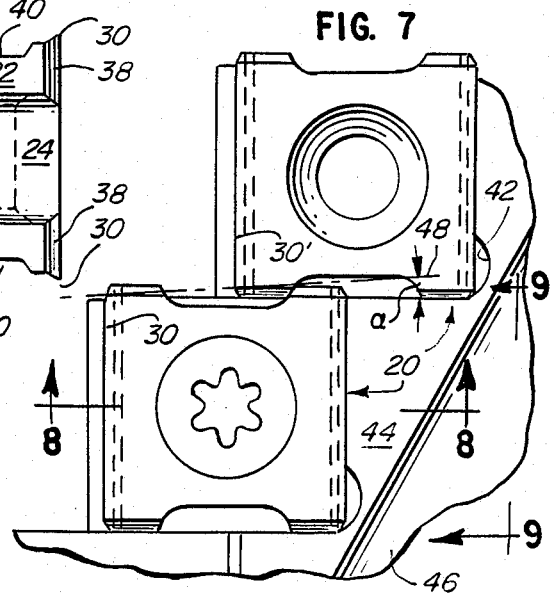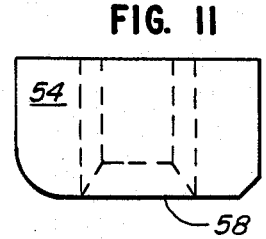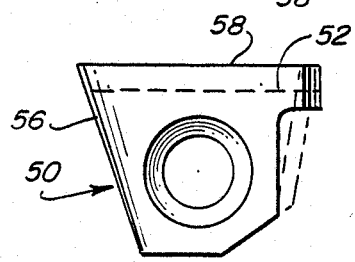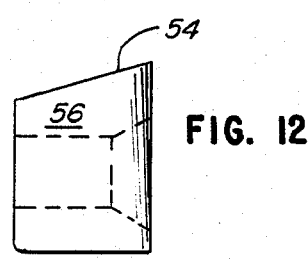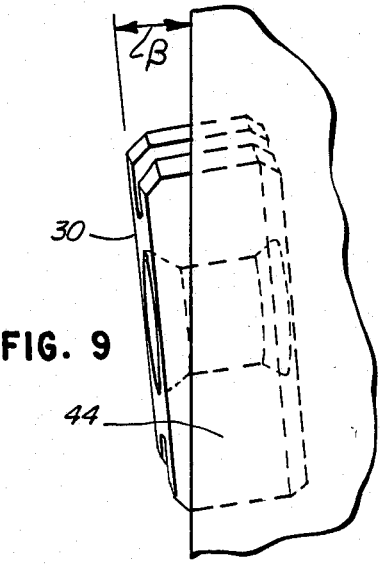

FIG. 13
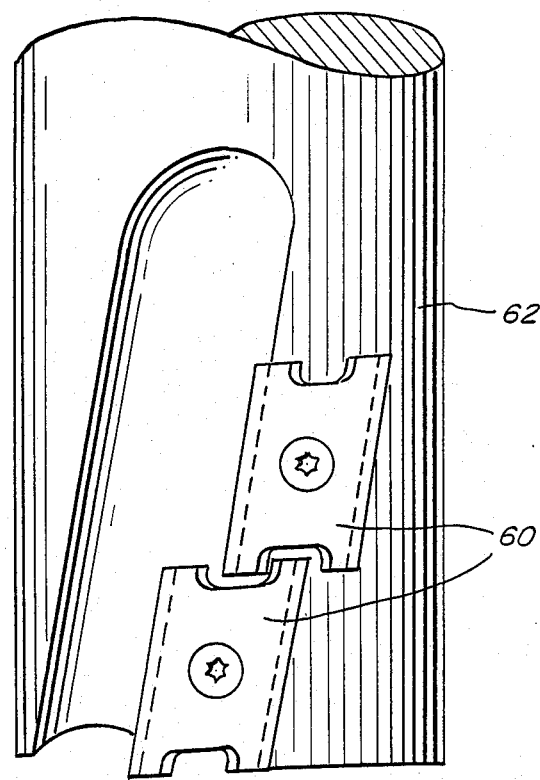
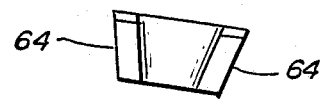
FIG. 14

INTERFITTING ON-EDGE INSERTS FOR MILLING CUTTERS

This is a continuation of application Ser. No. 011,591 filed Feb. 6, 1987, abandoned.

This invention relates to a form of on-edge cutting insert for milling tools which is adapted for cooperation with like inserts to provide a continuous effective cutting edge along a single chip gullet.

Heretofore, in milling cutters designed to produce cuts which exceed the length of the cutting edge of a single insert, the necessary length of cut has been accomplished with one or more auxiliary inserts associated with a trailing chip gullet, either effectively to extend the length of the cut made by a single preceding insert, or to fill the gap or gaps between adjacent but spaced inserts of the preceding chip gullet. That arrangement, which has been conventional practice in a variety of milling cutters, including, for example, end mills, gear gashers, slot mills, etc., obviously requires two chip gullets for a single effective cutting edge, a space requirement which has a limiting effect on the attainable metal removal rate of the tool.

In the context of end mills, for example, the necessary pairing of a leading and a trailing insert is a limitation upon the tool designer, particularly in the smaller diameter end mills where the aforementioned limitations require either 2, 4, or 6 chip gullets in the tool for half that number of effective cutting edges.

The insert of this invention is formed for interfitting cooperation with contiguous like inserts along a given chip gullet in a manner such as to provide a continuous effective cutting edge. In the end milling context, this frees the designer from the restraints imposed by the necessity of pairing chip gullets for a single effective cutting edge, permitting the use of odd numbers of chip gullets each with its own continuous effective cutting edge. In all mentioned forms of milling cutters, i.e., end mills, slotting mills of substantial face width, or gear gashing cutters cutting to depth exceeding the length of cutting edge of a single insert, the design capability made possible by the interfitting inserts of this invention, and the resulting continuous effective cutting edge associated with each individual chip gullet, permit design for higher feed rates and thus higher metal removal rates than their conventional counterparts wherever adequate spindle power is available and the stability of the work set-up will permit.

In brief, the on-edge indexable inserts of the invention are generally parallelepiped in preferred form with two major faces which serve alternately and respectively as seating and clearance faces, two opposed minor edge faces each providing two cutting edges at their intersections with the two major faces, and two remaining opposed minor edge faces which are recessed so that the sideward projections of the cutting edges defined by those recesses may be placed one behind the other in an interfitted array of like inserts circumferentially offset from one another along a single chip gullet.

The invention, and its application to milling cutters of the kind heretofore identified, is explained in the following specification in conjunction with the accompanying drawings, in which:

FIG. 4 is a plan view of the insert of the invention;

FIG. 5 is an edge view of the same, facing the cutting edges thereof;

FIG. 6 is a side edge view of the insert, facing the recess which permits the interfitting of the inserts;

FIG. 7 is an enlarged fragmentary view of two inserts of the invention disposed contiguously in offset interfitting relation, also illustrated in FIGS. 1 and 3;

FIG. 8 is a sectional view taken along the line 8—8 of FIG. 7, showing an insert secured in its pocket milled in the body of the tool;

FIG. 9 is a rear view of a single insert as mounted in the tool, illustrating the inclination of the insert for purposes to be described;

FIG. 10 is a plan view of one form of insert suitable for use as the bottoming insert of each chip gullet;

FIGS. 11 and 12 are, respectively, top and side edge views of the insert of FIG. 10;

FIG. 13 is an elevational view of an end mill equipped with a modified form of the insert of this invention; and FIG. 14 is an end view of such insert projected from FIG. 13.

Figure 1:
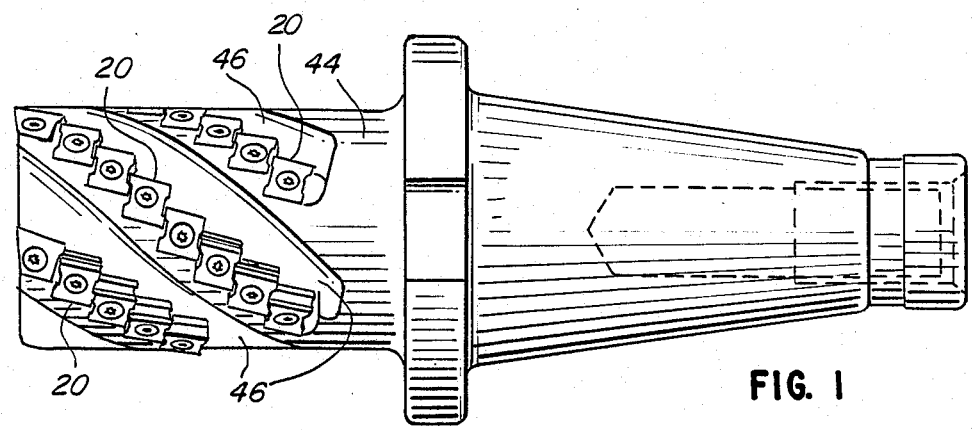
FIG. 1 is a side elevation of a right-handed end mill which employs the cutting inserts of the invention to provide a continuous effective cutting edge with positive axial rake along each flute or chip gullet of the tool.

Referring initially to FIGS. 4 to 6, inclusive, for a detailed description of the insert of this invention in preferred form, the insert 20 is a block essentially in the form of a rectangular parallelepiped with certain modifications of form to adapt it to its purpose. In particular, the two opposed side edge faces 22 of the insert are recessed midway thereof at 24 so that the ends of the opposed front and rear edge faces 26 project sidewardly as wing-like extensions 28.

The front and rear edge faces 26 of the six-sided insert are the rake faces of the insert. Each provides two cutting edges 30 at the intersection of each such edge face with the two major faces 32 of the insert, thus providing four cutting edges to which the insert of the invention may be indexed by rotation of the insert about an axis perpendicular to its major faces 32, and also by turning the insert over to expose the opposite major face thereof. As is otherwise conventional, the insert is formed with a central cored hole 34 for an insert retaining screw 36 (FIG. 8), the hole being countersunk from both ends to accommodate the head of the retaining screw at either major face of the insert.

Referring particularly to FIG. 5, the insert is preferably chamfered along the intersections 38 of both side edge faces 22 with the major faces 32 to avoid the chipping of the ends of the cutting edges 28 which might otherwise occur at a sharp corner. In addition, and depending upon the material to be cut, it may further be desirable to groove the front and rear edge faces 26 of the insert, as at 40, parallel to the cutting edges 30, in order to provide positive radial rake in a given cutting context.

Figure 2:
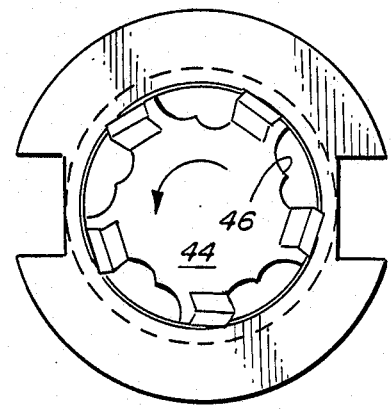
FIG. 2 is an end view of the end mill of FIG. 1.
Figure 3:
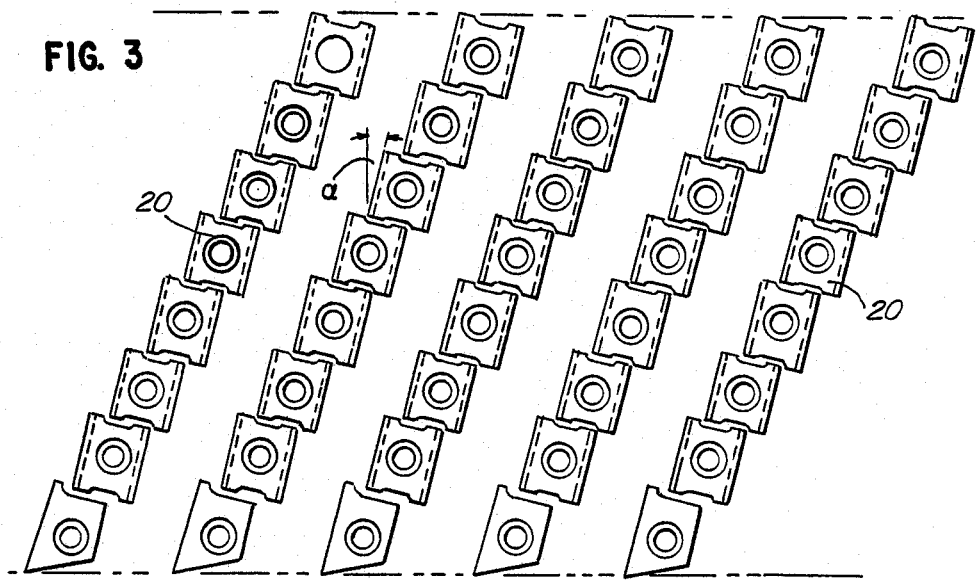
FIG. 3 is a developed view of the array of inserts employed in the end mill of FIGS. 1 and 2, illustrating the echeloned array of the inserts of the invention as they constitute the five continuous effective cutting edges of that end mill.

Referring to the fragmentary enlargement of FIG. 7, and also the FIGS. 1 to 3, inclusive, for illustration of the interfitting relationship of contiguous inserts 20 to provide a continuous effective cutting edge, it will be seen that the insert pockets 42 for adjacent inserts are milled in the body 44 of the tool and so dimensioned relative to the inserts that adjacent inserts interfit, i.e., so that the sidewardly extending wing-like projections 28 of the cutting edge 30 of one insert are complementarily received within the recesses 24 of the next adjacent inserts along a single chip gullet 46 to provide a continuous cutting path, notwithstanding the angular separation and resulting sequential action of adjacent inserts.

The degree of axial rake for a given cutting application may vary from tool to tool, but given the necessity for continuity in the effective cutting edge, i.e., of the cutting paths of the inserts 20 along a single flute 46, it is necessary, by a combination of the mutual placement of the sideward projections 28 of the cutting edges 30 of one insert into the recesses 24 of the other, and the axial rake angle $\alpha$ of the adjacent inserts, to eliminate gaps between the cutting paths swept by adjacent individual inserts. This may be seen from FIG. 7, in which a line 48 drawn from the end of the cutting edge 30 of the lower insert through the adjacent end of the cutting edge 30' of the upper insert emplaced within the recess of the first, determines the minimum axial rake angle $\alpha$ necessary for continuity. It may be appreciated from FIG. 7 that the deeper the insertion of the cutting edge of one insert into the recess of the next, and the more rearward the position of the inserted cutting edge within the recess, the smaller the rake angle required for continuity.

In the particular cutter 44 chosen to illustrate the invention, the helix angle of the chip gullet or flute 46 is somewhat greater than the axial rake angle $\alpha$ of the cutting edges of the insert, but, as can be appreciated from the laid-out view of FIG. 3, the helical orientation of the chip gullets is necessitated by the illustrated echeloned relation of the interfitted inserts irrespective of the rake angle thereof.

The rear or trailing edge view of a mounted insert, FIG. 9, illustrates somewhat exaggeratedly the tipping of the insert to the þspotting angle" $\beta$, which is necessary to position the opposite ends of the axially-raked cutting edge 30 of any given insert at the same radial distance from the rotational axis of the tool. That is, when an insert is rotated in its own plane to impart axial rake to its cutting edge, the trailing edge being radially depressed for clearance behind the cutting edge, the ends of the cutting edge become disposed at different swing radii and require a tipping of the clearance face out of parallelism to the rotational axis of the tool to restore the ends of the cutting edge to the same swing radius.

In the context of an end mill cutting with positive axial rake, as illustrated in FIGS. 1, 2, and 3, the upper edge of the insert is tipped outwardly to position the parallel major faces at the compensating spotting angle $\beta$ from a plane parallel to the axis of the tool in order to position the ends of the active cutting edge equidistantly from the rotational axis. In the relatively short length of the cutting edge of each insert compared to the swing radius, the hyperbolic deviation of the cutting path from linear is negligible.

Differing from the insert of the invention is the specially formed single-edge, non-indexable bottoming insert 50 at the tip of the tool 44 where the clearance requirements for cutting in that position dictate a different form. Referring in particular to FIGS. 10 to 12, inclusive, it will be seen that the tip insert 50 is provided at its upper end with a sidewardly projecting extension 52 of the rake face 54, similar to that provided in each of the inserts 20 mounted above it along the chip flute 46, omitting the similar sideward extension at the rear of the insert as unnecessary and without function in that position.

The edge face 56 of the tip insert is disposed at an acute angle to the rake face 54 in order to provide necessary clearance behind the rake face 54 at the bottom of the cut. As illustrated in FIGS. 10 to 12, the cutting edge 58 is shown terminating in a radius to provide a corresponding radius at the bottom of the cut, but it will be understood that radius may be reduced, at least, to a small chamfer for the sake of preventing chipping at the end of the long straight cutting edge.

The form of the tip insert may be further simplified as indicated by the broken lines in FIG. 10 by eliminating the sidewardly projecting ear 52 as such, and simply tapering the upper edge face of the insert as it recedes from the rake face 54, and, in that manner, provide the necessary clearance to receive the sideward projection 28 of the next adjacent insert 20 in defilade behind the rake face 54 of the tip insert.

For those end milling applications which will tolerate negative axial rake, e.g., edge milling or contouring of plates or slabs or other operations where chip clearing is not defeated by negative axial rake, the specially formed tip insert may be eliminated. This may be appreciated viewing FIG. 3 upside down, as though the developed view of a left-handed cutter with negative axial rake.

The form of the insert illustrated in FIGS. 1 to 9, inclusive, is preferred for its provision of four indexable cutting edges at each insert position. It will be appreciated however, from the foregoing description, that whereas those four indexable cutting edges result from the rectangularity of the generally parallelepiped preferred form, the interfitting of contiguous inserts can be achieved equally in skewed form of parallelepiped, i.e., one in which the major faces of the insert are parallelogram in form rather than rectangular, broadly speaking. In that type of insert, the opposed and parallel rake faces likewise provide two cutting edges, for a total of four, but only two of the four edges are usable at any insert position, as the skewed form necessarily results in the creation of "rights" and "lefts." Except in the cases of the less numerous slotting mills and gear gashers, in which "lefts" and "rights" are readily usable in a single cutter, this reduces the utility of the insert.

For some end mill applications, however, for example, end mills of small diameter, a skewed insert may be preferable because of the front-to-back dimensional limitations imposed by the small swing radius. Illustrated in FIGS. 13 and 14 are skewed inserts 60 in accordance with the invention, modified for use in a small end mill 62 of, say, one-inch diameter. For this special application, in which only two cutting edges would be usable at each insert position in any event, the grooving of the cutting face to provide two distinct rake faces is eliminated and the entire cutting face 64 simply ground to the desired radial rake angle. Moreover, inasmuch as the skewed form of the insert inherently provides clearance behind the bottom of the rake face in the tip position, no special form of insert is required in that position, the skewed form with two cutting edges being adequate to the task.

Where a radius is desired at the bottom of the cut, it may be provided in the manner of Johnson U.S. Pat. No. 4,411,564, i.e., by providing a radius at the intersection of the major and edge clearance faces which diminishes from the acute angle corner to the obtuse angle corner of the insert so that the cutting edge of the insert is merely slightly chamfered at the obtuse angle corner, and thus does not break the continuity of the effective cutting edge at the junction between the tip insert and the next adjacent insert.

As earlier indicated, the advantages of the invention are the continuous and uninterrupted cutting path provided by an assembly of its individual cutting inserts 20 or 60 positioned along a single chip gullet, notwithstanding the division of the cutting edge into multiple cutting inserts. The benefit of this result is the elimination of the necessity to pair chip gullets in order to provide a continuous effective cutting path. In the context of end mills, this renders their design more flexible by permitting the use of a single flute as well as odd numbers of flutes, but the more important benefit in all applicable milling cutters is the increased metal removal rates of which these tools are capable, and the speeding of production where the necessary spindle power is available and the work set-up provides adequate stability for its use.

The features of the invention believed new and patentable are set forth in the following claims.

What is claimed is:

1. An on-edge insert for milling cutters comprising a flat, six-sided block of cutting material having two major parallel plane faces constituting the seating and clearance faces respectively of the insert and two opposed minor edge surfaces providing two parallel cutting edges of equal rake angle by their respective intersections with at least one of said major faces and constituting the rake faces of the insert, said block having two additional opposed minor edge surfaces extending between said two major faces and said two first-mentioned minor edge surfaces, each of said last-mentioned minor edge surfaces being complementarily shaped by an indentation centrally of its major dimension to define a lateral projection of the block at each corner of the major faces and a recess in each of said last-mentioned minor edge surfaces extending between the lateral projections thereof and between said major faces to receive therein the lateral projection of an adjacent like insert in an interfitting array of such inserts with circumferentially offset cutting edges collectively constituting an uninterrupted effective cutting edge.

2. The cutting insert of claim 1 in which the two major faces of the insert are identical and alternatable as the seating and clearance faces, and the first-mentioned edge surfaces provide two opposed and parallel cutting edges by their intersections with each of the major faces of the insert.

3. The cutting insert of claim 2 wherein the parallel cutting edges of each major face of the insert coincide in perpendicular projection to each other.

4. The insert of claim 2 or claim 3 in which said first-mentioned edge surfaces are grooved between and parallel to the cutting edges associated therewith, and the rake angle between each of said first-mentioned edge surfaces and said two major faces is an acute angle.

5. A milling cutter having at least one chip gullet and a plurality of on-edge cutting inserts arrayed along the trailing edge of said chip gullet, said inserts being of the form defined by claim 1 and interfitted as specified therein with the active cutting edges of adjacent inserts sweeping contiguous concentric segments of a continuous cutting path.

6. An end mill according to claim 5 in which the chip gullet is helical and the cutting inserts are axially raked in the hand of the helix.

* * * * *

UNITED STATES PATENT AND TRADEMARK OFFICE
CERTIFICATE OF CORRECTION

PATENT NO. : 4,790,693
DATED : December 13, 1988
INVENTOR(S) : Robert T. Koblesky It is certified that error appears in the above-identified patent and that said Letters Patent is hereby corrected as shown below:

Column 3, line 37, before "spotting", change "♭" to --"--.

Column 4, line 9, after "that" insert --that--.

Signed and Sealed this

Twenty-fifth Day of April, 1989

Attest:

DONALD J. QUIGG

Attesting Officer

Commissioner of Patents and Trademarks